US011133513B2

United States Patent
Kawabe

(10) Patent No.: US 11,133,513 B2
(45) Date of Patent: Sep. 28, 2021

(54) SEPARATOR FOR FUEL CELL

(71) Applicant: TOYOTA BOSHOKU KABUSHIKI KAISHA, Aichi-ken (JP)

(72) Inventor: Satoshi Kawabe, Ichinomiya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 9 days.

(21) Appl. No.: 16/750,467

(22) Filed: Jan. 23, 2020

(65) Prior Publication Data
US 2020/0251751 A1 Aug. 6, 2020

(30) Foreign Application Priority Data

Jan. 31, 2019 (JP) .............................. JP2019-016135

(51) Int. Cl.
H01M 8/0256 (2016.01)
H01M 8/1006 (2016.01)
H01M 8/026 (2016.01)

(52) U.S. Cl.
CPC ......... *H01M 8/0256* (2013.01); *H01M 8/026* (2013.01); *H01M 8/1006* (2013.01)

(58) Field of Classification Search
CPC .. H01M 8/0256; H01M 8/026; H01M 8/0206; H01M 8/1006
See application file for complete search history.

(56) References Cited

U.S. PATENT DOCUMENTS 6,490,778 B1 * 12/2002 Funatsu .............. H01M 8/0258
29/557

FOREIGN PATENT DOCUMENTS

JP 2016-066531 4/2016
JP 2016066531 A * 4/2016

* cited by examiner

*Primary Examiner* — Olatunji A Godo
(74) *Attorney, Agent, or Firm* — Greenblum & Bernstein, P.L.C.

(57) ABSTRACT

A separator for a fuel cell includes a separator base, crest sections, and trough sections. Regions surrounded by the respective trough sections and a corresponding electrode layer each constitute a passage that supplies oxidation gas or fuel gas to the electrode layer. A thin film having conductivity is placed at least on the top surface of each crest section. The thin film on the top surface of each crest section has a groove that connects the passages on the opposite sides of the crest section to each other. Each trough section has a flow resistance increasing portion on the downstream side of the groove in the flow direction of the gas. The flow resistance increasing portion reduces the cross-sectional flow area of the passage such that the cross-sectional flow area at the flow resistance increasing portion is smaller than that at the section to which the groove is connected.

7 Claims, 4 Drawing Sheets

SEPARATOR FOR FUEL CELL

BACKGROUND

1. Field

The present disclosure relates to a separator for a fuel cell that is arranged between membrane electrode assemblies in a fuel cell.

2. Description of Related Art

FIG. 6 shows a conventional fuel cell 70 disclosed in Japanese Laid-Open Patent Publication No. 2016-66531. The fuel cell 70 includes membrane electrode assemblies (MEA) 71 and separators 75. The separators 75 are located on the opposite sides of each membrane electrode assembly 71 in the thickness direction (the up-down direction in FIG. 6) and sandwich the membrane electrode assembly 71. The membrane electrode assembly 71 includes an electrolyte membrane 72 and two electrode layers arranged on the opposite sides of the electrolyte membrane 72 in the thickness direction. One of the electrode layers constitutes a cathode electrode layer 73, and the other electrode layer constitutes an anode electrode layer 74. In the fuel cell 70, the membrane electrode assemblies 71 are separated by the separators 75 such that each membrane electrode assembly 71 is sandwiched between the separators 75 on the opposite sides in the thickness direction.

Each separator 75 includes a separator base 76, which is made of metal having conductivity. Each separator base 76 has multiple crest sections 77, which protrude toward the membrane electrode assembly 71, and multiple trough sections 78, which are recessed in the direction opposite to the protruding direction of the crest sections 77. The crest sections 77 and the trough sections 78 are alternately arranged in a direction along the plane of the membrane electrode assembly 71 (the left-right direction in FIG. 6) and extend parallel to each other.

Regions surrounded by the respective trough sections 78 and the cathode electrode layer 73 each constitute a passage 81 that supplies oxidation gas to the cathode electrode layer 73. Regions surrounded by the respective trough sections 78 and the anode electrode layer 74 each constitute a passage 82 that supplies fuel gas to the anode electrode layer 74.

A thin film 85 having conductivity is placed on the top surface of each crest section 77. The thin films 85 are provided to suppress increase in the contact resistance between the membrane electrode assembly 71 and the separator base 76 of each separator 75 so as to reduce the influence of the contact resistance on the reaction of fuel gas and oxidation gas in the membrane electrode assembly 71. The contact resistance refers to electric resistance in the area including the interface between two objects when the objects are brought into contact with each other and a current is passed through the objects.

In the above-described fuel cell 70, when fuel gas is supplied to the anode electrode layer 74 and oxidation gas is supplied to the cathode electrode layer 73, power is generated based on the reaction of the fuel gas and the oxidation gas in the membrane electrode assembly 71. At this time, water is generated in the cathode electrode layer 73 with the reaction. Part of the generated water is located between the cathode electrode layer 73 and each thin film 85. A portion of the water that is close to the passages 81 flows along with the oxidation gas that flows through the passages 81 at a high flow velocity and is discharged to the outside of the fuel cell 70.

However, a portion of the water that is away from the passages 81 is not discharged to the outside of the fuel cell 70 by the flow of oxidation gas through the passages 81, but remains between the cathode electrode layer 73 and the thin films 85. The remaining water may cause insufficient diffusion of oxidation gas. This may diminish the reaction of fuel gas and oxidation gas.

The power generation efficiency can be improved by soaking the cathode electrode layer 73 and the anode electrode layer 74 with a certain amount of water. In this regard, the thickness of the membrane electrode assembly 71 may be reduced. The reduced thickness of the membrane electrode assembly 71 allows water generated in the cathode electrode layer 73 to readily move toward the anode electrode layer 74 along the electrolyte membrane 72. However, if more water than necessary is retained between the respective thin films 85 and the anode electrode layer 74, and surplus water remains in the vicinity of the anode electrode layer 74, fuel gas cannot readily contact the anode electrode layer 74. This can reduce the reaction of fuel gas and oxidation gas.

SUMMARY

Accordingly, it is an objective of the present disclosure to provide a separator for a fuel cell that improves the discharge performance for water generated with power generation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a separator for a fuel cell is provided. The separator is used in a fuel cell having a membrane electrode assembly. The membrane electrode assembly includes an electrolyte membrane and electrode layers that are joined to opposite sides of the electrolyte membrane in a thickness direction. The separator for a fuel cell includes a separator base, a plurality of crest sections, and a plurality of trough sections. The separator base is arranged on an outer side of the membrane electrode assembly in the thickness direction and has conductivity. The crest sections are provided in the separator base and protrude toward the membrane electrode assembly. The trough sections are provided in the separator base and recessed in a direction opposite to a direction in which the crest sections protrude. The crest sections and the trough sections are alternately arranged in a direction along a plane of the membrane electrode assembly and extend parallel to each other. Regions surrounded by the respective trough sections and a corresponding electrode layer each constitute a passage that supplies oxidation gas or fuel gas to the electrode layer. A thin film having conductivity is placed at least on a top surface of each crest section in surfaces of the crest sections and the trough sections that face the corresponding electrode layer. The thin film on the top surface of each crest section has a groove that connects the passages on opposite sides of the crest section to each other. Each trough section has a flow resistance increasing portion on a downstream side of the groove in a flow direction of the gas. The flow resistance increasing portion reduces a cross-sectional flow area of the passage such that the cross-sectional flow area at the flow resistance increasing portion is smaller than that at a section to which the groove is connected.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A separator for a fuel cell according to a first embodiment will now be described with reference to FIGS. 1 to 3.

Figure 1:
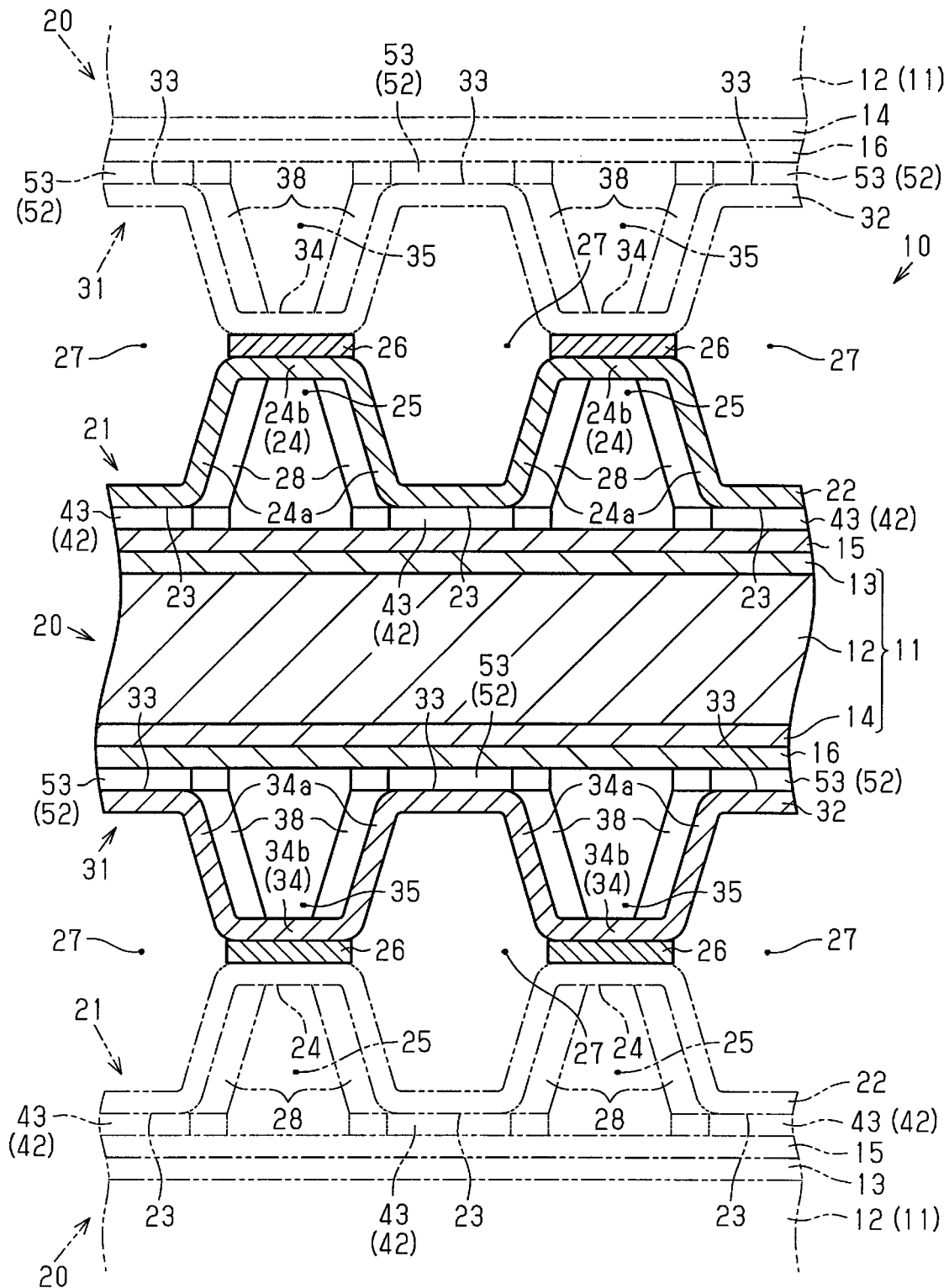
FIG. 1 is a partial cross-sectional view of a fuel cell according to a first embodiment.

As shown in FIG. 1, a fuel cell 10 includes membrane electrode assemblies 11. Each membrane electrode assembly 11 is sandwiched by separators for a fuel cell from the opposite sides in the thickness direction (the up-down direction in FIG. 1). To distinguish the two separators for a fuel cell from each other, the one located above each membrane electrode assembly 11 (one of the outer sides in the thickness direction) will be referred to as a first separator 21, and the one located below (the other outer side in the thickness direction) will be referred to as a second separator 31.

The membrane electrode assemblies 11 are separated from each other by the first separator 21 and the second separator 31 arranged in between. Each membrane electrode assembly 11 includes an electrolyte membrane 12 and two electrode layers joined to the opposite sides of the electrolyte membrane 12 in the thickness direction. One (the upper one in FIG. 1) of the electrode layers constitutes a cathode electrode layer 13, and the other electrode layer (the lower one in FIG. 1) constitutes an anode electrode layer 14.

A gas diffusion layer 15 is arranged on the opposite side (the upper side in FIG. 1) of the cathode electrode layer 13 from the electrolyte membrane 12. The gas diffusion layer 15 is made of carbon fiber or the like and promotes diffusion of oxidation gas, which will be discussed below. A gas diffusion layer 16 is arranged on the opposite side (the lower side in FIG. 1) of the anode electrode layer 14 from the electrolyte membrane 12. The gas diffusion layer 16 is made of carbon fiber or the like and promotes diffusion of fuel gas, which will be discussed below.

The first and second separators 21, 31 sandwich the membrane electrode assembly 11 and the gas diffusion layers 15, 16 from the opposite sides (the outer sides) in the thickness direction. The membrane electrode assembly 11, the gas diffusion layers 15, 16, the first separator 21, and the second separator 31 constitute a cell unit 20. Multiple cell units 20 are stacked in the thickness direction to constitute the cell stack of the fuel cell 10.

Figure 2:
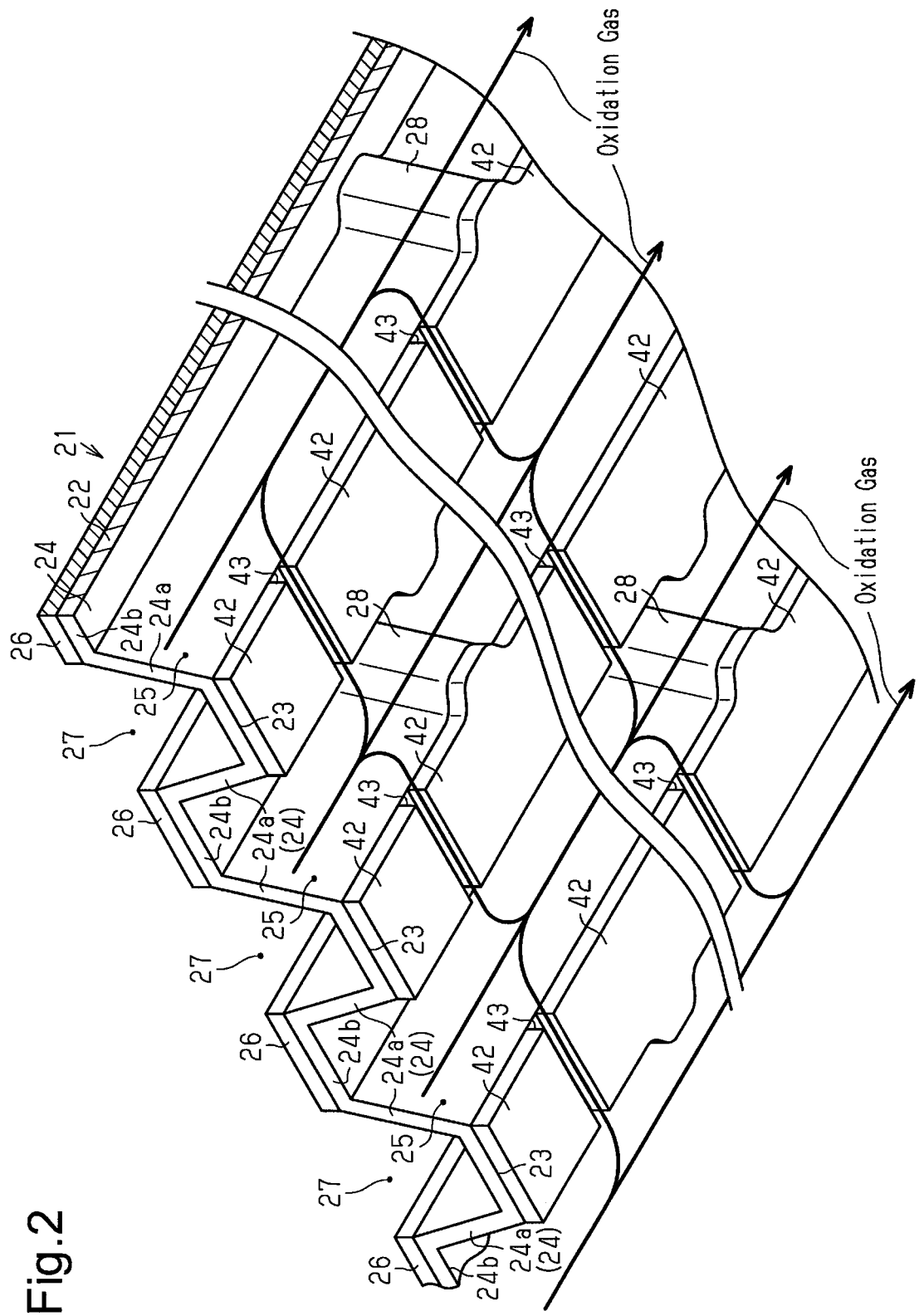
FIG. 2 is a partial perspective view of a first separator according to the first embodiment.

As shown in FIGS. 1 and 2, the framework of each first separator 21 is constituted by a separator base 22, which is made of metal having conductivity. In the first embodiment, each separator base 22 is made of a stainless steel plate having a thickness of about 100 μm.

Each separator base 22 has multiple crest sections 23, which protrude toward the membrane electrode assembly 11, and multiple trough sections 24, which are recessed in the direction opposite to the protruding direction of the crest sections 23. In FIGS. 1 and 2, the crest sections 23 protrude downward, and the trough sections 24 are recessed upward. Each trough section 24 includes two side walls 24a and a bottom wall 24b. The side walls 24a face each other in the arrangement direction of the crest sections 23 and the trough sections 24 (the left-right direction in FIG. 1). The bottom wall 24b couples the bottoms of the side walls 24a to each other. The crest sections 23 and the trough sections 24 are alternately arranged in a direction along the plane of the membrane electrode assembly 11 (the left-right direction in FIG. 1) and extend parallel to each other. Regions surrounded by the respective trough sections 24 and the cathode electrode layer 13 each constitute a passage 25 that supplies oxidation gas (for example, air) to the cathode electrode layer 13.

As shown in FIG. 1, the framework of each second separator 31 is constituted by a separator base 32, which is made of metal having conductivity. In the first embodiment, each separator base 32 is made of a stainless steel plate having a thickness of about 100 μm, as in the case of the above-described separator base 22.

Each separator base 32 has multiple crest sections 33, which protrude toward the membrane electrode assembly 11, and multiple trough sections 34, which are recessed in the direction opposite to the protruding direction of the crest sections 33. In FIG. 1, the crest sections 33 protrude upward, and the trough sections 34 are recessed downward. Each trough section 34 includes two side walls 34a and a bottom wall 34b. The side walls 34a face each other in the arrangement direction of the crest sections 33 and the trough sections 34 (the left-right direction in FIG. 1). The bottom wall 34b couples the bottoms of the side walls 34a to each other. The crest sections 33 and the trough sections 34 are alternately arranged in a direction along the plane of the membrane electrode assembly 11 (the left-right direction in FIG. 1) and extend parallel to each other. Regions surrounded by the respective trough sections 34 and the anode electrode layer 14 each constitute a passage 35 that supplies fuel gas (for example, hydrogen) to the anode electrode layer 14.

As described above, the cell stack of the fuel cell 10 includes multiple cell units 20, which are stacked in the thickness direction. Thus, as represented by the long dashed double-short dashed lines in FIG. 1, the second separator 31 of the cell unit 20 located above is arranged above the first separator 21 of the cell unit 20 located in the center in the up-down direction in FIG. 1. An intervening layer 26 is arranged between the bottom of each trough section 24 of the first separator 21 and the bottom of the corresponding trough section 34 of the second separator 31 located above. The intervening layers 26 are configured to suppress increase in the contact resistance between the trough sections 24, 34. The intervening layers 26 are made of a material that has a conductivity higher than (an electric resistance value lower than) that of the separator bases 22, 32. For example, the intervening layers 26 are made of carbon, gold, or platinum. Further, a passage 27 is defined between each crest section 23 of the first separator 21 and the corresponding crest section 33 of the second separator 31 located above. Coolant (for example, cooling water) flows through the passage 27.

Likewise, as represented by the long dashed double-short dashed lines in FIG. 1, the first separator 21 of the cell unit 20 located below is arranged below the second separator 31 of the cell unit 20 located in the center in the up-down direction in FIG. 1. An intervening layer 26 is arranged between the bottom of each trough section 34 of the second separator 31 and the bottom of the corresponding trough section 24 of the first separator 21 located below. Further, a passage 27 is defined between each crest section 33 of the second separator 31 and the corresponding crest section 23 of the first separator 21 located below. Coolant flows through the passage 27.

As shown in FIGS. 1 and 2, thin films 42 are provided on the separator base 22 of the first separator 21 of each cell unit 20. Specifically, in the surfaces of the crest sections 23 and the trough sections 24 that face the cathode electrode layer 13, the thin films 42 are placed on the top surfaces of the crest sections 23. The thin films 42 are provided to suppress increase in the contact resistance between the membrane electrode assembly 11 and the separator bases 22 so as to reduce the influence of the contact resistance on reaction of fuel gas and oxidation gas in the membrane electrode assembly 11. The thin films 42 are made of the same material as that of the intervening layers 26 and are formed through ink jet printing to have a thickness of, for example, several hundred nanometers to several hundred micrometers. The thin films 42 have a hydrophilicity higher than that of the separator bases 22. Each first separator 21 contacts the gas diffusion layer 15 at the thin films 42. In other words, each thin film 42 of the first separator 21 indirectly contacts the cathode electrode layer 13 via the gas diffusion layer 15.

Each thin film 42 has grooves 43, which extend in a direction intersecting with the direction in which the crest sections 23 extend. In the first embodiment, the grooves 43 extend in a direction orthogonal to the direction in which the crest sections 23 extend (the left-right direction in FIG. 1). The grooves 43 are separated from each other in the direction in which the crest sections 23 extend. Each trough section 24 has a flow resistance increasing portion, which will be discussed below. In the thin films 42 on the crest sections 23, which are located on the opposite sides of the trough section 24, the grooves 43 are provided at positions facing each other in the arrangement direction of the crest sections 23 and the trough sections 24. The depth of the grooves 43 is set to be the same as the thickness of the thin film 42. Thus, the top surface of the crest section 23 is exposed at positions where the grooves 43 are provided.

The passages 25 are located on the opposite sides of each crest section 23, on which the thin film 42 having the grooves 43 are provided. In the thin film 42 on the top surface of each crest section 23, one end of each groove 43 is connected to one of the passages 25, which are located on the opposite sides of the crest section 23, and the other end is connected to the other passage 25. Thus, the passages 25 on the opposite sides of each crest section 23 are continuous with each other through the grooves 43. The cross-sectional flow area of the section of each groove 43 that is connected to the passage 25 is smaller than that of the section of the passage 25 that is connected to the groove 43.

Figure 3:
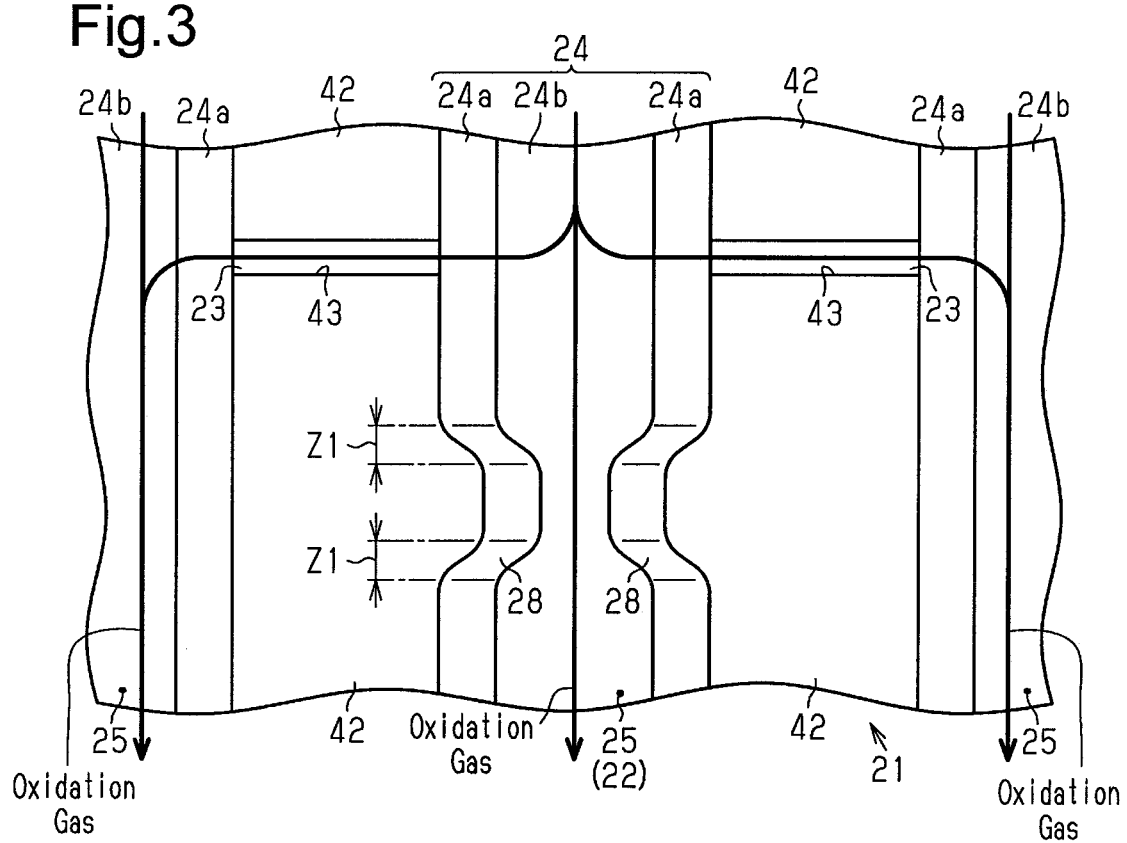
FIG. 3 is a partial bottom view of the first separator according to the first embodiment.

As shown in FIGS. 1 to 3, each trough section 24 has a flow resistance increasing portion on the downstream side of the grooves 43 in the flow direction of oxidation gas. The flow resistance increasing portion reduces the cross-sectional flow area of the passage 25 such that the cross-sectional flow area at the flow resistance increasing portion is smaller than that at the section to which the grooves 43 are connected. The flow resistance increasing portions in each adjacent pair of the trough sections 24 are located at different positions in the passages 25 in the flow direction of oxidation gas (see FIG. 2). Each flow resistance increasing portion is constituted by a pair of protrusions 28 provided on the side walls 24a of the corresponding trough section 24. The pair of protrusions 28 protrude toward each other and are located on the side walls 24a at positions facing each other in the arrangement direction of the crest sections 23 and the trough sections 24.

In each adjacent pair of the trough sections 24, the combinations of the protrusions 28 and the grooves 43 connected to the passage 25 of which the cross-sectional flow area is reduced by the protrusions 28 are located at different positions in the flow direction of oxidation gas.

As shown in FIG. 1, thin films 52 are provided on the separator base 32 of the second separator 31 of each cell unit 20. Specifically, in the surfaces of the crest sections 33 and the trough sections 34 that face the anode electrode layer 14, the thin films 52 are placed on the top surfaces of the crest sections 33. Each thin film 52 is provided for the same purpose, made of the same material, by the same method, of the same thickness and the same hydrophilicity as the thin films 42 on the first separator 21. The second separator 31 contacts the gas diffusion layer 16 at the thin films 52 provided on the respective crest sections 33. Each thin film 52 has grooves 53, which extend in the same direction as the grooves 43 of the first separator 21. In the thin film 52 on the top surface of each crest section 33, one end of each groove 53 is connected to one of the passages 35, which are located on the opposite sides of the crest section 33, and the other end is connected to the other passage 35. Each trough section 34 has a flow resistance increasing portion, which will be discussed below. In the thin films 52 on the crest sections 33, which are located on the opposite sides of the trough section 34, the grooves 53 are provided at positions facing each other in the arrangement direction of the crest sections 33 and the trough sections 34. The passages 35 on the opposite sides of each crest section 33 are continuous with each other through the grooves 53. The cross-sectional flow area of the section of each groove 53 that is connected to the passage 35 is smaller than that of the section of the passage 35 that is connected to the groove 53.

Each trough section 34 has a flow resistance increasing portion on the downstream side of the grooves 53 in the flow direction of fuel gas. The flow resistance increasing portion reduces the cross-sectional flow area of the passage 35 such that the cross-sectional flow area at the flow resistance increasing portion is smaller than that at the section to which the grooves 53 are connected. The flow resistance increasing portions in each adjacent pair of the trough sections 34 are located at different positions of the passages 35 in the flow direction of fuel gas. Each flow resistance increasing portion is constituted by a pair of protrusions 38 provided on the side walls 34a of the corresponding trough section 34. The pair of the protrusions 38 protrude toward each other and are located on the side walls 34a at positions facing each other in the arrangement direction of the crest sections 33 and the trough sections 34.

In each adjacent pair of the trough sections 34, the combinations of the protrusions 38 and the grooves 53 connected to the passage 35 of which the cross-sectional flow area is reduced by the protrusions 38 are located at different positions in the flow direction of fuel gas.

The above-described first separator 21 is manufactured in the following manner. First, a flat stainless steel plate is prepared. The stainless steel plate is stamped to form a separator base 22 that has crest sections 23 and trough sections 24. A material having a conductivity higher than that of the separator base 22 is applied to the top surface of each crest section 23 through ink jet printing to form a thin film 42 having grooves 43. The second separator 31 is manufactured through the same steps as the first separator 21.

Next, an operation and advantages of the first embodiment configured as described above will be described.

Oxidation gas flows through the passages 25 as indicated by the arrows in FIGS. 2 and 3. Also, fuel gas flows through the passages 35. At this time, the protrusions 28 serve as resistance to the flow of oxidation gas. This is because the cross-sectional flow area in each trough sections 24 is smaller at the position where the protrusions 28 are provided than at the position where the protrusions 28 are not provided. The oxidation gas can flow through the grooves 43, which are provided in the thin film 42 to connect the passages 25 on the opposite sides of the crest section 23 to each other. Part of the oxidation gas flowing through one of the passages 25 on the opposite sides of each crest section 23 can change the flow direction and flow into the other passage 25 through the groove 43. Thus, part of the oxidation gas flowing through the passage 25 in which the flow resistance is increased by the protrusions 28 flows along the passage 25 and passes between the protrusions 28. However, other part of the oxidation gas flowing through the passage 25 passes through the groove 43 located on the upstream side of the protrusions 28 in the flow direction of the oxidation gas to move to an adjacent passage 25 in which the flow resistance is not increased by the protrusions 28. The oxidation gas then flows through the adjacent passage 25.

Likewise, when fuel gas flows through each passage 35, the protrusions 38 serve as resistance to the flow of fuel gas as shown in FIG. 1. Thus, part of the fuel gas flowing through the passage 35 in which the flow resistance is increased by the protrusions 38 passes between the protrusions 38. However, other part of the fuel gas flowing through the passage 35 passes through the groove 53 located on the upstream side of the protrusions 38 in the flow direction of the fuel gas to move to an adjacent passage 35 in which the flow resistance is not increased by the protrusions 38. The fuel gas then flows through the adjacent passage 35.

Oxidation gas (air) flowing through each passage 25 is supplied to the cathode electrode layer 13 via the gas diffusion layer 15. Fuel gas (hydrogen) that flows through each passage 35 is supplied to the anode electrode layer 14 via the gas diffusion layer 16. Power is generated based on the reaction of the supplied fuel gas and oxidation gas in the membrane electrode assembly 11. The reaction also generates water in the cathode electrode layer 13, to which oxidation gas has been supplied.

Specifically, when fuel gas (hydrogen) is supplied to the anode electrode layer 14, electrons are removed from hydrogen atoms and delivered to the anode electrode layer 14. Those electrons flow to the cathode electrode layer 13 from the anode electrode layer 14 through lead wires of the external circuit (not shown). Removal of electrons from hydrogen atoms in the anode electrode layer 14 generates positively charged hydrogen ions (protons), which then move to the cathode electrode layer 13 via the electrolyte membrane 12. In the meantime, in the cathode electrode layer 13, to which oxidation gas (air) is supplied, oxygen atoms receive electrons to become oxygen ions. Further, hydrogen ions that have moved from the anode electrode layer 14 to the cathode electrode layer 13 via the electrolyte membrane 12 are bonded to the oxygen ions, so that water is generated in the cathode electrode layer 13.

Part of the generated water is located in the gas diffusion layer 15 between the cathode electrode layer 13 and each thin film 42. A portion of the water that is close to each passage 25 is pulled toward the passage 25 by the oxidation gas flowing through the passage 25 as shown in FIGS. 1 to 3. When moved into the passage 25, the water flows along with the oxidation gas through the passage 25. Also, a portion of the water that is close to each groove 43 is expelled, by the oxidation gas flowing through the groove 43, to the passage 25 in which the flow resistance is not increased by the protrusions 28. The water then flows along with the oxidation gas in the passage 25 into which the water has been expelled. As described above, the water that flows along with the oxygen gas through the passage 25 is ultimately discharged to the outside of the fuel cell 10.

Thus, as compared to a case in which no grooves 43 are provided, the amount of water discharged from the fuel cell 10 is increased. This improves the water discharge performance. Also, unlike a case in which no grooves 43 are provided, the generated water is prevented from remaining in the gas diffusion layer 15. Insufficient diffusion of oxidation gas due to the remaining water will not be caused. Thus, reaction of the fuel gas and the oxidation gas is unlikely to be diminished.

As shown in FIG. 1, the power generation efficiency can be improved by soaking the cathode electrode layer 13 and the anode electrode layer 14 with a certain amount of water. In this regard, the thickness of the membrane electrode assembly 11 may be reduced. This allows the water generated in the cathode electrode layer 13 to readily move toward the anode electrode layer 14 along the electrolyte membrane 12. However, if more water than necessary remains in the gas diffusion layer 16, and surplus water remains in the vicinity of the anode electrode layer 14, fuel gas (hydrogen) cannot readily contact the anode electrode layer 14. This can reduce the reaction of the fuel gas and the oxidation gas in the membrane electrode assembly 11.

However, a portion of the water in the gas diffusion layer 16 that is close to each passage 35 is pulled toward the passage 35 by the fuel gas flowing through the passage 35. When moved into the passage 35, the water flows along with the fuel gas through the passage 35.

Further, in the first embodiment, the thin films 52 of the second separator 31 also have grooves 53, which prevent more water than necessary from being retained in the gas diffusion layer 16. That is, a portion of the water in the gas diffusion layer 16 that is close to each groove 53 is expelled, by the fuel gas flowing through the groove 53, to the passage 35 in which the flow resistance is not increased by the protrusions 38. The water then flows along with the fuel gas in the passage 35 into which the water has been expelled. Then, as described above, the water that flows along with the fuel gas through the passage 35 is ultimately discharged to the outside of the fuel cell 10.

Thus, as compared to a case in which no grooves 53 are provided, the amount of water discharged from the fuel cell 10 is increased. This improves the water discharge performance. Also, unlike a case in which no grooves 53 are provided, the generated water is prevented from remaining in the gas diffusion layer 16 so that surplus water remains in the vicinity of the anode electrode layer 14. Insufficient diffusion of oxidation gas due to the remaining water will not be caused. Thus, reaction of the fuel gas and the oxidation gas is unlikely to be diminished.

In addition to the ones described above, the first embodiment has the following advantages.

In the first separator 21, if the objective is only to reduce the cross-sectional flow area of the passage 25, the flow resistance increasing portion (the protrusion 28) will simply need to be provided on one of the side walls 24a of the trough section 24.

However, in the first embodiment, a stainless steel plate is stamped to form the flow resistance increasing portion configured by the protrusions 28. If the flow resistance increasing portion has a section in which the shape is changed abruptly, problems may occur. For example, the stainless steel may be broken. To solve such problems, the flow resistance increasing portion needs to have a section in which the shape is changed gradually (a long entrance section). However, a long entrance section causes a new problem, specifically, increases the length of the flow resistance increasing portion in the direction in which the trough section 24 extends.

In this regard, in the first embodiment, the flow resistance increasing portion is provided on both of the side walls 24a. The flow resistance increasing portion is configured by a pair of protrusions 28 that are provided at facing sections on the side walls 24a and protrude toward each other. Under the condition that the cross-sectional flow area that is reduced by the flow resistance increasing portion is the same in the passage 25, the size of a single protrusion 28 is smaller in a case in which the flow resistance increasing portion is configured by two protrusions 28 than in a case in which the flow resistance increasing portion is configured by a single protrusion 28. Accordingly, as shown in FIG. 3, the entrance section Z1 of each protrusion 28 is shortened. This reduces the length of the flow resistance increasing portion in the extending direction of the trough section 24 (the up-down direction in FIG. 3).

As shown in FIG. 1, in each second separator 31, the flow resistance increasing portion is configured by a pair of protrusions 38 that protrude toward each other and are provided at sections on the side walls 34a that face each other in the arrangement direction of the crest sections 33 and the trough sections 34. Accordingly, as in the case of the first separator 21, the length of the flow resistance increasing portion in the extending direction of the trough section 34 is reduced in the second separator 31.

As shown in FIG. 3, in the first embodiment, each trough section 24 has the flow resistance increasing portion and is located between the corresponding two crest sections 23, on which the thin films 42 are provided. The grooves 43 are provided in the thin films 42 at positions facing each other in the arrangement direction of the crest sections 23 and the trough sections 24. Thus, as described above, part of oxidation gas flowing through each passage 25 is distributed to both sides in the arrangement direction at a position upstream of the flow resistance increasing portion (the protrusions 28) in the flow direction of the oxidation gas. The streams of the distributed oxidation gas flow away from each other through the grooves 43 and move to the passages 25 in which the flow resistance is not increased by the flow resistance increasing portion (the protrusions 28) and flow through those passages 25.

Also, a portion of the water remaining in the gas diffusion layer 15 that is close to each groove 43 is expelled by the oxidation gas flowing through the groove 43 to the passage 25 in which the flow resistance is not increased by the flow resistance increasing portion (the protrusions 28). The water flows along with the oxidation gas in the passage 25 into which the water has been expelled and is then discharged to the outside of the fuel cell 10.

Therefore, oxidation gas and water are allowed to flow in a well balanced manner as compared to a case in which the grooves 43 are not provided at positions facing each other in the arrangement direction of the crest sections 23 and the trough sections 24.

As shown in FIG. 1, each trough section 34 has the flow resistance increasing portion and is located between the corresponding two crest sections 33, on which the thin films 52 are provided. The grooves 53 are provided in the thin films 52 at positions facing each other in the arrangement direction of the crest sections 33 and the trough sections 34. Therefore, fuel gas and water are allowed to flow in a well balanced manner in the second separator 31 as in the case of the first separator 21.

As shown in FIG. 2, in each adjacent pair of the trough sections 24, the combinations of the protrusions 28 and the grooves 43 connected to the passage 25 of which the cross-sectional flow area is reduced by the protrusions 28 are located at different positions in the flow direction of oxidation gas. Thus, when oxidation gas has flowed to the vicinity of the protrusions 28 in the passage 25, the flow is hindered by the increase in the flow resistance, so that the oxidation gas flows to the adjacent passages 25 via the grooves 43. When the oxidation gas has flowed to the vicinity of the protrusions 28 in the passage 25, the flow is hindered by the increase in the flow resistance, so that the oxidation gas flows to the adjacent passages 25 via the grooves 43. In this manner, each time oxidation gas flows to the vicinity of the protrusions 28, the oxidation gas moves to the adjacent passages 25 via the grooves 43. This allows the oxidation gas to evenly flow along the plane of the membrane electrode assembly 11.

A portion of the water remaining in the gas diffusion layer 15 that is close to the passages 25 flows along with the oxidation gas. Also, a portion of the water remaining in the gas diffusion layer 15 that is close to each groove 43 is expelled by the oxidation gas flowing through the groove 43 to the passage 25 in which the flow resistance is not increased by the protrusions 28. This allows the water to evenly flow along the plane of the membrane electrode assembly 11 and to be discharged to the outside of the fuel cell 10.

As shown in FIG. 1, in each adjacent pair of the trough sections 34 of the second separator 31, the combinations of the protrusions 38 and the grooves 53 connected to the passage 35 of which the cross-sectional flow area is reduced by the protrusions 38 are located at different positions in the flow direction of fuel gas. Therefore, the second separator 31 has the same advantages as the first separator 21.

If the hydrophilicity of the thin films 42 in the first separator 21 is low, the water in the grooves 43 is likely to be repelled by the inner surfaces of the grooves 43 and is unlikely to move in the grooves 43. The water in the grooves 43 is thus unlikely to move to the passages 25.

However, in the first embodiment, since the thin films 42 have a hydrophilicity higher than that of the separator base 22, the water in the grooves 43 is likely to be spread on the inner surfaces of the grooves 43. This allows the water in the grooves 43 to smoothly move to the passages 25.

Further, since the thin films 52 of each second separator 31 have a hydrophilicity higher than that of the separator base 32, the water in the grooves 53 smoothly moves to the passages 35 as in the case of the first separator 21.

The thin films 42, 52, which have the grooves 43, 53, are formed through ink jet printing. Thus, the shapes of the grooves 43, 53 in the thin films 42, 52 can be changed easily through pattern adjustment of the ink jet printing.

In the thin films 42, 52, the separator bases 22, 32 are exposed at the sections where the grooves 43, 53 are provided. In other words, the sections on the top surfaces of the crest sections 23, 33 that correspond to the grooves 43, 53 are free of the thin films 42, 52. Thus, ink material does not need to be applied to the sections on the top surfaces where the grooves 43, 53 will be formed. The grooves 43, 53 are therefore easy to form.

Second Embodiment

Figure 4:
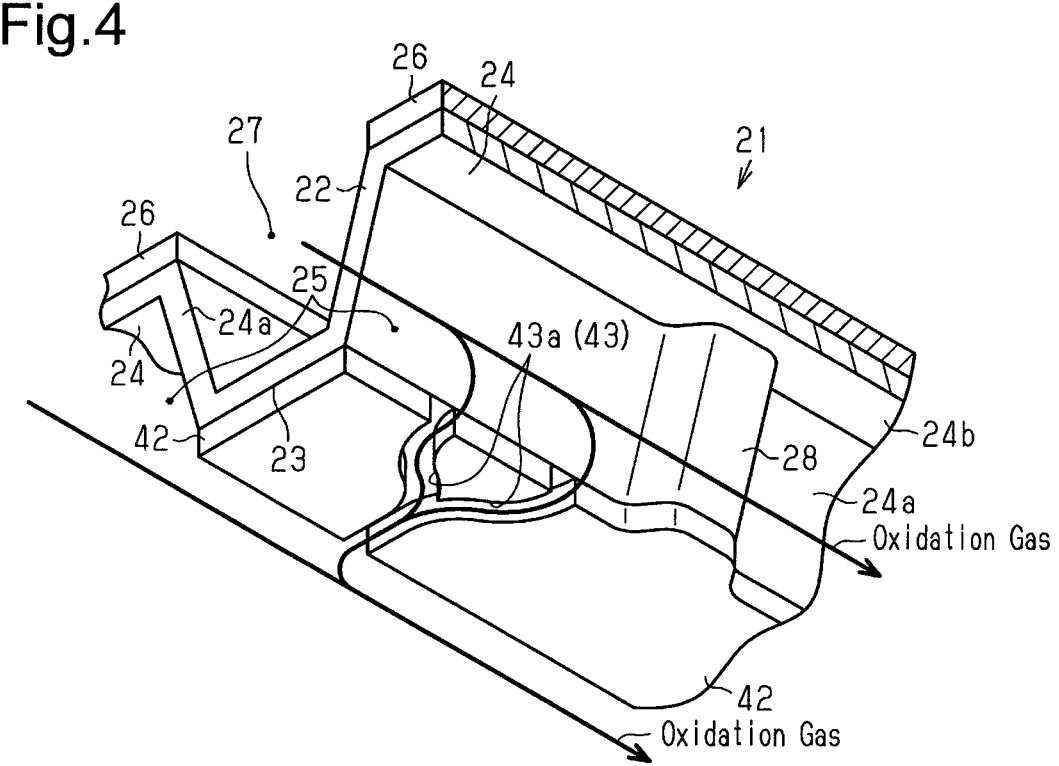
FIG. 4 is a partial perspective view of a first separator according to a second embodiment.

A separator for a fuel cell according to a second embodiment will now be described with reference to FIG. 4.

In the second embodiment, the groove 43 of each first separator 21 has branch groove sections 43a. Although FIG. 4 illustrates two branch groove sections 43a, three or more branch groove sections 43a may be provided. Of the passages 25 on the opposite sides of the crest section 23, the branch groove sections 43a are branched at a starting point closer to the passage 25 of which the cross-sectional flow area is not reduced by the protrusions 28 (the lower left one in FIG. 4). Of the passages 25 on the opposite sides of the crest section 23, the ends of the branch groove sections 43a that are farther from the starting point are connected, while being separated from each other, to the passage 25 of which the cross-sectional flow area is reduced by the protrusions 28 (the upper right one in FIG. 4).

The configuration other than the above is similar to the first embodiment. Thus, the same components as those in the first embodiment are given the same reference numerals, and detailed explanations are omitted.

The second embodiment thus achieves the same operations and advantages as the first embodiment.

Further, as described in the first embodiment, part of the oxidation gas flowing through the passage 25 in which the flow resistance is increased by the protrusions 28 (the upper right one in FIG. 4) moves to the passage 25 in which the flow resistance is not increased by the protrusions 28 (the lower left one in FIG. 4) through the groove 43, which is located upstream of the protrusions 28 in the flow direction of the oxidation gas. The oxidation gas then flows through the passage 25 to which the oxidation gas has moved. At this time, the streams of the oxidation gas flow through the respective branch groove sections 43a and then merge to flow into the passage 25 in which the flow resistance is not increased by the protrusions 28. Such merging is expected to increase the flow velocity of the oxidation gas. Also, since the oxidation gas flows through the respective branch groove sections 43a and water merges after flowing along with the streams of the oxidation gas, a larger amount of water remaining in the gas diffusion layer 15 is expected to be expelled.

Although not illustrated, the groove 53 in each second separator 31 may include two or more branch groove sections like the groove 43. In this case, of the passages 35 located on the opposite sides of the crest section 33, the branch groove sections are branched at a starting point closer to the passage 35 of which the cross-sectional flow area is not reduced by the protrusions 38. Of the passages 35 located on the opposite sides of the crest section 33, the ends of the branch groove sections that are farther from the starting point are connected to, while being separated from each other, to the passage 35 of which the cross-sectional flow area is reduced by the protrusions 38. This configuration is expected to achieve the same operations and advantages as the groove 43 of the first separator 21.

Third Embodiment

Figure 5:
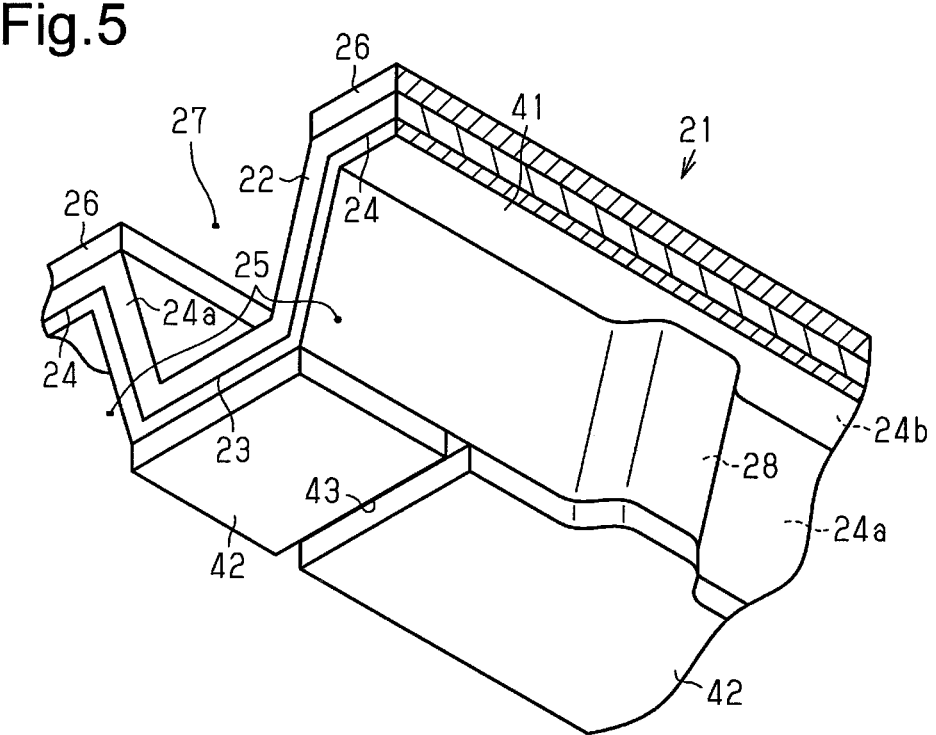
FIG. 5 is a partial perspective view of a first separator according to a third embodiment.
Figure 6:
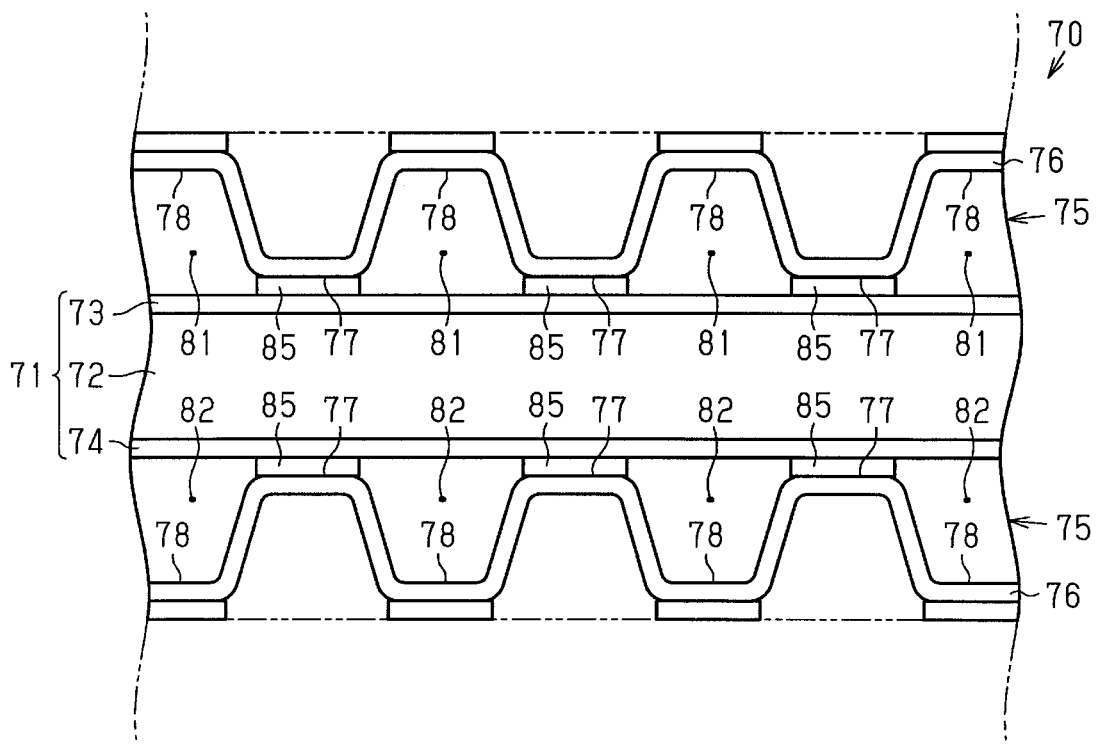
FIG. 6 is a diagram of a conventional fuel cell, schematically illustrating a state in which a membrane electrode assembly is sandwiched by separators from the opposite sides in the thickness direction.

A separator for a fuel cell according to a third embodiment will now be described with reference to FIG. 5.

The third embodiment is different from the first embodiment in the layer structure of the first separator 21 of each cell unit 20. In the third embodiment, a first thin film 41 is provided on the separator base 22 of the first separator 21. The first thin film 41 is placed over the entire surfaces of the crest sections 23 and the trough sections 24 that face the cathode electrode layer 13. The first thin film 41 has conductivity and a corrosion resistance higher than that of the separator base 22. In the third embodiment, the first thin film 41 is made of a material obtained by mixing conductive particles such as titanium nitride (TiN) into plastic.

The thin film 42 of the first embodiment is provided, as a second thin film in the third embodiment, on a section of the first thin film 41 that is placed on the top surface of the crest section 23. The thin film 42 has grooves 43, which connect the passages 25 on the opposite sides of the crest section 23 to each other. The grooves 43 are separated from each other in the direction in which the crest sections 23 extend. The depth of the grooves 43 is set to be the same as the thickness of the thin film 42. Thus, the first thin film 41 is exposed at positions where the grooves 43 are provided.

The configuration other than the above is similar to the first embodiment. Thus, the same components as those in the first embodiment are given the same reference numerals, and detailed explanations are omitted.

The third embodiment thus achieves following operations and advantages in addition to the same operations and advantages as the first embodiment.

In the fuel cell 10, when acidic substances are generated as by-products of reaction in the electrolyte membrane 12, the separator base 22, which is made of a stainless steel plate, may be eroded or corroded through electrochemical reaction with the acidic substances. At this time, iron ions are eluted from the separator base 22. This may degrade the performance of the components of the membrane electrode assembly 11, for example, the electrolyte membrane 12 and the catalyst (not shown).

However, in the third embodiment, elution of iron ions is suppressed by the first thin film 41, which is provided over the entire surfaces of the crest section 23 and the trough section 24 that face the cathode electrode layer 13. Therefore, the first thin film 41 prevents the performance of the components of the membrane electrode assembly 11 from being degraded due to eluted iron ions.

Although not illustrated, a first thin film may be provided on the separator base 32 of the second separator 31 of each cell unit 20. In this case, the first thin film is placed over the entire surfaces of the crest section 33 and the trough section 34 that face the anode electrode layer 14. The first thin film has conductivity and a corrosion resistance higher than that of the separator base 32. The thin film 52 of the first embodiment is provided, as a second thin film in the third embodiment, on a section of the first thin film that is placed on the top surface of the crest section 33. The thin film 52 has grooves 53, which connect the passages 35 on the opposite sides of the crest section 33 to each other. This configuration is expected to achieve the same operations and advantages of suppressing elution of iron ions due to corrosion of the separator base 32 as in the case of the first thin film 41.

The above-described embodiments may be modified as follows.

<Regarding Separator Bases 22, 32>

The separator bases 22, 32 may be made of any metal other than stainless steel as long as it has conductivity. For example, the separator bases 22, 32 may be made of titanium.

<Regarding First Thin Film 41 and Thin Films 42, 52>

The thin films 42, 52 may be made of the same material as that of the first thin film 41.

The thin films 42, 52 may be provided on other sections of the crest sections 23, 33 or on the trough sections 24, 34 in addition to the top surfaces of the crest sections 23, 33. However, considering the troublesomeness and costs of formation of the thin films 42, 52, the thin films 42, 52 are preferably provided only on the top surfaces of the crest sections 23, 33.

If the thin films 42, 52 are provided on sections other than the top surfaces of the crest sections 23, 33, the cross-sectional flow areas of the passages 25, 35 are reduced accordingly. Therefore, the thin films 42, 52 are preferably provided only on the top surfaces of the crest sections 23, 33, where the thin films 42, 52 are required.

In the above-described embodiments, the thin films 42, 52 have a hydrophilicity higher than that of the separator bases 22, 32. However, the present disclosure is not limited to this.

In the third embodiment, one of the first thin film 41 on the first separator 21 and the first thin film on the second separator 31 may be omitted.

In the first to third embodiments, one of the thin film 42 on the first separator 21 and the thin film 52 on the second separator 31 may be omitted.

<Regarding Grooves 43, 53>

The grooves 43, 53 of the first and third embodiments may extend in a direction diagonally intersecting with the direction in which the crest sections 23, 33 extend.

One of the groove 43 in the first separator 21 and the groove 53 in the second separator 31 may be omitted.

In each of the above-described embodiments, the depths of the grooves 43, 53 may be set smaller than the thickness of the thin films 42, 52 at sections where the grooves 43, 53 are not provided. In this case, parts of the thin films 42, 52 are provided in sections where the grooves 43, 53 are provided. Unlike the above-described embodiments, in the thin films 42, 52, the separator bases 22, 32 or the first thin film 41 are not exposed at the sections of the thin films 42, 52 where the grooves 43, 53 are provided. Ink jet printing allows for formation of thin films 42, 52 that include sections of a smaller thickness than other parts (grooves 43, 53).

The groove 43 of the second embodiment, which includes two or more branch groove sections 43a, may be applied to the third embodiment.

<Regarding Flow Resistance Increasing Portion>

The flow resistance increasing portion of the first separator 21 may be constituted by a protrusion 28 that is provided on only one of the side walls 24a of the trough section 24 and protrudes toward the opposed side wall 24a.

The flow resistance increasing portion of the second separator 31 may also be constituted by a protrusion 38 that is provided on only one of the side walls 34a like the flow resistance increasing portion of the first separator 21.

The flow resistance increasing portion of the first separator 21 may be constituted by a protrusion that protrudes from the bottom wall 24b of the trough section 24 toward the cathode electrode layer 13.

The flow resistance increasing portion of the second separator 31 may also be constituted by a protrusion that protrudes from the bottom wall 34b toward the anode electrode layer 14 like the flow resistance increasing portion of the first separator 21.

The flow resistance increasing portion of the first separator 21 may be provided to extend over the bottom wall 24b and at least one of the side walls 24a of the trough section 24.

The flow resistance increasing portion of the second separator 31 may be provided to extend over the bottom wall 34b and at least one of the side walls 34a of the trough section 34.

ANOTHER MODIFICATION

The first and second separators 21, 31 may be employed in a fuel cell that does not have the gas diffusion layers 15, 16.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A separator for a fuel cell, the separator being used in a fuel cell having a membrane electrode assembly, wherein
the membrane electrode assembly includes
an electrolyte membrane, and
electrode layers that are joined to opposite sides of the electrolyte membrane in a thickness direction,
the separator for a fuel cell comprises:
a separator base that is arranged on an outer side of the membrane electrode assembly in the thickness direction and has conductivity, a plurality of crest sections that are provided in the separator base and protrude toward the membrane electrode assembly, and a plurality of trough sections that are provided in the separator base and recessed in a direction opposite to a direction in which the crest sections protrude, the crest sections and the trough sections are alternately arranged in a direction along a plane of the membrane electrode assembly and extend parallel to each other, regions surrounded by the respective trough sections and a corresponding electrode layer each constitute a passage that supplies oxidation gas or fuel gas to the electrode layer, a thin film having conductivity is placed at least on a top surface of each crest section in surfaces of the crest sections and the trough sections that face the corresponding electrode layer, the thin film on the top surface of each crest section has a groove that connects the passages on opposite sides of the crest section to each other, each trough section has a flow resistance increasing portion on a downstream side of the groove in a flow direction of the gas, and the flow resistance increasing portion reduces a cross-sectional flow area of the passage such that the cross-sectional flow area at the flow resistance increasing portion is smaller than that at a section to which the groove is connected.

2. The separator for a fuel cell according to claim 1, wherein the groove includes a plurality of branch groove sections in the thin film on the top surface of each crest section, of the passages on the opposite sides of the crest section, the branch groove sections are branched at a starting point closer to the passage of which the cross-sectional flow area is not reduced by the flow resistance increasing portion, and of the passages on the opposite sides of the crest section, ends of the branch groove sections that are farther from the starting point are connected to, while being separated from each other, the passage of which the cross-sectional flow area is reduced by the flow resistance increasing portion.

3. The separator for a fuel cell according to claim 1, wherein each trough section includes two side walls that face each other in an arrangement direction of the crest sections and the trough sections, and each flow resistance increasing portion is configured by a pair of protrusions that are provided at facing sections on the side walls of a corresponding trough section and protrude toward each other.

4. The separator for a fuel cell according to claim 1, wherein, in the thin films on the crest sections located on opposite sides of the trough section in which the flow resistance increasing portion is provided, the grooves are provided at positions facing each other in an arrangement direction of the crest sections and the trough sections.

5. The separator for a fuel cell according to claim 1, wherein, in each adjacent pair of the trough sections, combinations of the flow resistance increasing portion and the groove that is connected to the passage of which the cross-sectional flow area is reduced by the flow resistance increasing portion are located at different positions in the flow direction of the gas.

6. The separator for a fuel cell according to claim 1, wherein the separator base is made of metal, a first thin film is placed over the entire surfaces of the crest sections and the trough sections that face the corresponding electrode layer, the first thin film has conductivity and a corrosion resistance higher than that of the separator base, and the thin film is provided, as a second thin film, on a section of the first thin film that is placed at least on the top surface of each crest section.

7. The separator for a fuel cell according to claim 1, wherein each flow resistance increasing portion is configured by a protrusion provided on a wall of a corresponding trough section.

* * * * *